Aug. 4, 1942.       O. WITTEL ET AL       2,292,312
STEREOSCOPIC FILM MOUNT
Filed June 18, 1940
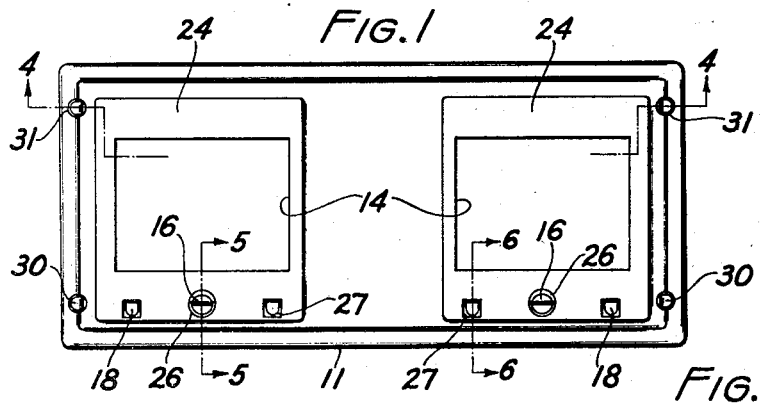
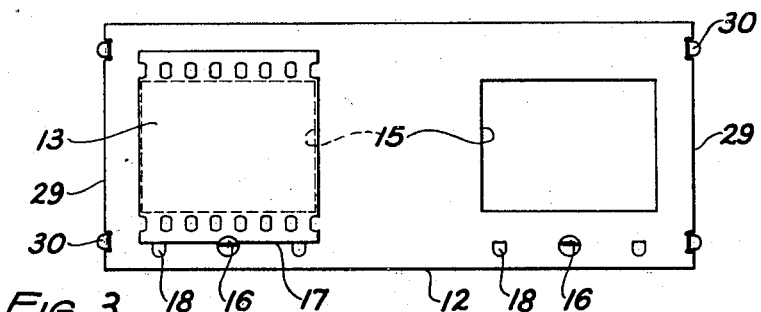
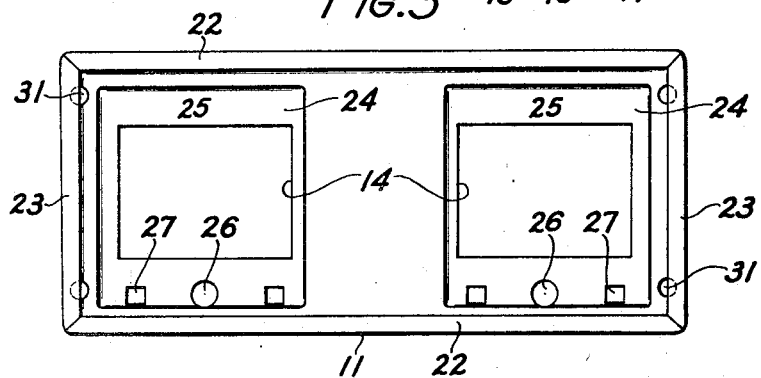
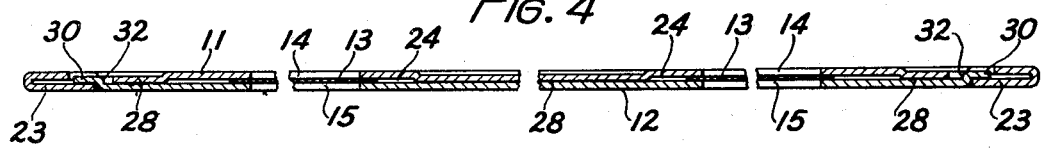
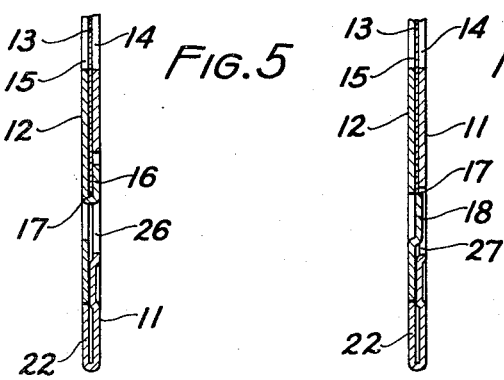
OTTO WITTEL
JOSEPH L. BOON
INVENTORS
BY
ATTORNEYS Patented Aug. 4, 1942

2,292,312

UNITED STATES PATENT OFFICE 2,292,312

STEREOSCOPIC FILM MOUNT

Otto Wittel and Joseph L. Boon, Rochester, N. Y., assignors to Eastman Kodak Company, Rochester, N. Y., a corporation of New Jersey Application June 18, 1940, Serial No. 341,166

6 Claims. (Cl. 88—26)

The present invention relates to mounts, and more particularly to mounts in which a pair of stereo transparencies are arranged in proper spaced relation.

One object of the invention is the provision of a mount of the class described in which the stereo transparencies are retained in position between a pair of plate members and are secured to only one of the plates.

Another object of the invention is the provision of an arrangement by which said transparency is secured at only a single point along one edge to one of the plate members.

Still another object of the invention is the provision of an arrangement by which rotational displacement or movement of the transparency is prevented.

Yet another object of the invention is the provision of a simple, and novel arrangement for detachably connecting the plate members to facilitate assembling or dismantling of the mount.

A further object of the invention is the provision of a mount of the class described which is simple and rugged in construction, comprises few parts, readily and easily assembled or dismantled, relatively inexpensive to manufacture, and highly effective in use.

To these and other ends, the invention resides in certain improvements and combinations of parts all as will be hereinafter more fully described, the novel features being pointed out in the claims at the end of the specification:

In the drawing:

Fig. 1 is a front elevation view of a stereo mount constructed in accordance with the preferred embodiment of the invention;

Fig. 2 is a front elevation view of one of the plate members of the mount in dismantled relation, showing the arrangement for securing and positioning one of the stereo transparencies thereon;

Fig. 3 is a rear elevation view of the other plate member, showing the relation of the various parts thereof;

Fig. 4 is a longitudinal sectional view through the assembled mount, taken substantially on line 4—4 of Fig. 1, but on a larger scale than the latter, showing the relation of the various parts constituting the mount and the arrangement for detachably connecting the two plate members shown in Figs. 2 and 3;

Fig. 5 is a transverse sectional view through a portion of the mount illustrated in Fig. 1 but on a larger scale than the latter and taken substantially on line 5—5 of Fig. 1, showing the arrangement for securing one of the transparencies to the plate illustrated in Fig. 2; and Fig. 6 is a view similar to Fig. 5 but taken substantially on line 6—6 of Fig. 1, showing the arrangement of the plate illustrated in Fig. 2 for preventing rotation of the transparency.

Similar reference numerals throughout the various views indicate the same parts.

The stereoscopic film mount of the present invention is herein embodied in a mount which comprises broadly, a pair of flat plate-like members 11 and 12 of any suitable material, preferably thin sheet metal, between which a pair of stereo transparencies 13 are arranged in proper spaced relation. The plates 11 and 12 are formed with pairs of apertures 14 and 15 respectively which are spaced the average interpupillar distance; and which, when in assembled relation, are arranged to register, as shown in Fig. 4.

The plate 12 is preferably made flexible, for reasons to be later described, and is formed with a pair of upstruck ears 16, one of which is positioned below and substantially on the vertical center line of each aperture 15, as clearly illustrated in Fig. 2. Each of these ears is adapted to receive the lower edge 17 of one of the transparencies 13; and, when bent over, securely retains the latter at only one point along the edge 17 to the plate 12, as will be readily apparent from inspection of Fig. 2. Thus each transparency is held only at one point by the bent over ear 16. In order to prevent tilting or rotational movement of either transparency relative to the plate 12 or the apertures 14 and 15, means is provided for engaging the edge 17 on opposite sides of each ear 16.

This engaging means comprises, in the present embodiment, embossings 18 formed from the material of the plate 12 and positioned on opposite sides of each holding ear 16 to engage the edge 17 of the transparency 13 to prevent tilting or rotation of the latter about the holding ear 16 and relative to the viewing apertures 14 and 15. By means of this arrangement, each transparency 13 is secured to the plate 12 at only one point along the edge 17 and is positively held against rotational movement about the ear 16.

The front plate 11 is slightly larger than the film holding plate 12 and has the side and end edges folded over to form side and end marginal flanges 22 and 23 respectively which serves to strengthen or reinforce the plate 11. The end flanges 23 also serve to retain the plate 12 in assembled relation with the plate 11, as will be later described. The plate 12 is preferably of such size as to just fit within the area formed by the flanges 22 and 23 of the plate 11 when the two plates are assembled, as shown in Fig. 1. The areas surrounding the apertures 14 of the plate 11 are depressed or embossed to provide seats or recesses 24 adapted to receive the transparencies 13 which are secured to the plate 12 in the manner above described. Each seat has a depth substantially equal to the thickness of the transparency 13 so that the front face 25 of the seat cooperates with the plate 12 to retain the transparencies in flat position. The seat or recesses 24 are preferably made slightly larger than the transparencies, see Fig. 4, to permit the latter to move slightly therein during expansion or contraction to prevent buckling, the advantages of which are apparent to those in the art. These seats also cooperate with the embossings 18 to retain the transparencies in substantial registration with the apertures 14 and 15. One side of each recess 24 is formed with openings 26 and 27 of such shape and location as to receive the ear 16 and the embossings 18 respectively to permit the main portions of the plate 11 and 12 to lie in intimate contact, as shown at 28, Fig. 4.

It is thus apparent that while the transparencies are separately held at only one point onto the plate 12, the transparencies are retained in flat or uniplanar position between the plates and are effectively held against rotational movement to retain them in positive alignment with the viewing apertures 14 and 15. The plates 11 and 12 are also preferably so connected that they may be readily separated or dismantled to permit replacement of the transparencies, and/or to facilitate the assembling of the plates subsequent to the mounting of the transparencies 13 on the holding plate 12.

To this end, each side edge 29 of the plate 12 has projecting laterally therefrom a pair of spaced lugs 30, as best shown in Fig. 2. These lugs are arranged to be inserted under the end flanges 23 of the plate 11, see Figs. 1 and 4, to retain the plates 11 and 12 in assembled relation, as will be later more fully explained. To facilitate such insertion, the plate 11 is formed with holes or apertures 31 arranged in register with the lugs 30. The latter are preferably offset or bent out of the plane of the plate 11 so as to lie substantially in the plane of the plate 12, as shown at 32, Fig. 4, when the two plates are connected in assembled relation.

In assembling the mount, each transparency 13 is positioned on the plate 12 in registery with the proper aperture 15 thereof and with the bottom edge 17 in engagement with the ear 16 and the positioning embossings 17. The ear 16 is then bent over to secure the transparency to the plate 12, as shown in Fig. 2. The plate 12 is then turned over to position the transparencies adjacent the recesses or seats 24 on the plate 11. One pair of lugs 30 on the plate 12 are then inserted in the registering opening 31 of the plate 11. This lug and hole arrangement thus provides, in effect, a hinge connection by which the plate 12 may be swung toward and relative to the plate 11. The plate 12 is then flexed or bowed longitudinally to slightly decrease its overall length. The opposite lugs 30 are then inserted under the other end flange 23 of the plate 12. Upon releasing of the plate 11, the latter flexes in the reverse direction to again assume its uniplanar position and to slide the lugs 30 under the flanges 23 and into the plane of the plate 11 to detachably or releasably retain the two plates in assembled relation, as clearly illustrated in Fig. 4. When the plate 12 reaches its normal assembled position, the transparencies are simultaneously and automatically positioned in the recessed seats 24 of the plate 11. The parts are now in the assembled position, and the transparencies 13 are retained in alignment with the apertures 14 and 15 and are held against rotatable movement relative thereto. If for any reason, it is desired to change or replace the transparencies, the plate 12 is again fixed or bowed to permit the removal of one pair of holding lugs 30 from under its holding flange 23. The plate 11 may then be either partially or completely disconnected from the plate 11 to permit replacing of the transparencies 13 thereon.

It is thus apparent from the above description that each transparency is securely held in position between the two plates and is secured at only one point to one of the plates. It is also apparent that the transparencies are retained against rotatable movement relative to the plates and the viewing apertures. In addition, the two plates are formed so the same may be quickly and easily assembled or dismantled. Finally the mount is formed of few parts of rugged construction and is relatively simple in construction and inexpensive to manufacture as well as being highly effective in use. While the above described mount has been shown for use in mounting a pair of stereo transparencies, it will be readily apparent that the structural features of the mount are equally suitable for mounting a single transparency. Such a use is contemplated.

While only one embodiment of the invention has been disclosed, it is to be understood that the inventive idea may be carried out in a number of ways. This application is therefore not to be limited to the precise details described, but is intended to cover all variations and modifications thereof falling within the scope of the appended claims.

We claim:

1. A slide comprising, in combination, two plates positioned in overlying relation and between which an image area is arranged said plates being formed with registering apertures adapted to frame said area, means on one of said plates for securing said area thereto only at a single point along a single edge of said area, means on said one plate adjacent said securing means for preventing rotational displacement of said area and to retain the latter in registry with said apertures, means on said other plate for spacing the plates at the image area to allow free movement of the area in its plane, and means for releasably connecting said plates.

2. A slide comprising, in combination, two plates positioned in overlying relation and between which an image area is arranged, said plates being formed with registering apertures adapted to frame said area, an upstruck ear formed from one of said plates adjacent one edge of the aperture thereof for engaging each area at a single point only to hold the area on said one plate, a pair of embossings formed from said one plate adjacent said ear and positioned on opposite sides thereof to engage an edge of said area to prevent rotational displacement of the area and to retain the latter in registry with said apertures, and means for releasably connecting said plates.

3. A transparency slide comprising, in combination, two plates positioned in overlying relation and between which a transparency is arranged said plates being formed with registering apertures adapted to frame said transparency, an upstruck ear formed from one of said plates adjacent the aperture thereof to secure the transparency at only a single point to said one plate, a pair of embossings formed from said one plate adjacent the aperture thereof and adapted to engage an edge of said transparency to prevent rotational displacement of said transparency and to retain the latter in registry with the apertures of said plates, a recessed portion on said other plate surrounding the aperture thereof and arranged to receive the transparency held by said one plate, said portion cooperating with said embossings to retain the transparency in registry with said apertures but allowing free motion of the transparency in its planes to prevent buckling and means for releasably connecting said plates.

4. A transparency slide comprising, in combination, two plates positioned in overlying relation and between which a transparency is arranged, said plates being formed with registering apertures adapted to frame said transparency, means on one of said plates for securing said transparency thereto only along a single edge, a pair of turned over flanges formed on the ends of the other plate, and a pair of lugs projecting laterally from the side edges of said one plate and arranged to be inserted under and retained by said flanges to detachably connect said plates.

5. A transparency slide comprising, in combination, two plates positioned in overlying relation and between a transparency is arranged, said plates being formed with pairs of spaced registering apertures adapted to frame said transparency, means on one of said plates for securing said transparency thereto only along a single edge, marginal flanges formed on the ends of the other plate, and a pair of lugs projecting laterally from the side edges of said one plate and bent out of the plane thereof and arranged to be inserted under said flanges to lie in the plane of said other plate to detachably secure said plates in assembled relation.

6. A stereo slide comprising, in combination, two plates positioned in overlying relation and between which a pair of stereo images are arranged in lateral spaced relation, said plates being formed with pairs of spaced registering apertures adapted to frame said areas, an upstruck ear formed from one of said plates adjacent each aperture thereof to separately secure each area at a single point to said one plate, a pair of embossings formed from said one plate adjacent each aperture thereof and adapted to engage an edge of one of said areas to prevent rotational displacement of said area and to retain the latter in registry with the apertures of said plates, a recessed portion on said other plate surrounding the apertures thereof and arranged to receive the areas held by said one plate, said portions cooperating with said embossings to retain the areas in registry with said apertures but allowing free motion of the areas in their planes to prevent buckling of said areas, marginal flanges formed on the opposite ends of the other of said plates, and a pair of offset lugs projecting laterally from the side edges of said one plate and extending under said flanges to lie in the plane of said other plate to detachably retain the plates in assembled relation.

OTTO WITTEL.
JOSEPH L. BOON.